United States Patent
Hajee et al.

(10) Patent No.: US 9,873,620 B2
(45) Date of Patent: Jan. 23, 2018

(54) MODULAR ILLUMINATION ASSEMBLY HAVING A BASE UNIT AND AN ACCESSORY UNIT MECHANICALLY AND ELECTRICALLY CONNECTABLE TO THE BASE UNIT

(71) Applicant: NURU ENERGY DESIGN AND DEVELOPMENT, Port Louis (MU)

(72) Inventors: Sameer Hajee, Calgary (CA); Simon Nicholas Tremeer, Cape Town (ZA); Barry Martin Whitmill, Cape Town (ZA)

(73) Assignee: CATALYST DESIGN AND DEVELOPMENT, Port Louis (MU)

( * ) Notice: Subject to any disclaimer, the term of this patent is extended or adjusted under 35 U.S.C. 154(b) by 17 days.

(21) Appl. No.: 14/435,038

(22) PCT Filed: Oct. 10, 2013

(86) PCT No.: PCT/IB2013/002261
§ 371 (c)(1),
(2) Date: Apr. 10, 2015

(87) PCT Pub. No.: WO2014/057340
PCT Pub. Date: Apr. 17, 2014

(65) Prior Publication Data
US 2015/0285449 A1  Oct. 8, 2015

Related U.S. Application Data

(63) Continuation-in-part of application No. 12/991,092, filed on Jun. 30, 2011, now Pat. No. 8,585,260.
(Continued)

(51) Int. Cl.
*F21S 2/00* (2016.01)
*C02F 1/32* (2006.01)
(Continued)

(52) U.S. Cl.
CPC .............. *C02F 1/325* (2013.01); *F21L 2/00* (2013.01); *F21L 4/08* (2013.01); *F21S 2/005* (2013.01);
(Continued)

(58) Field of Classification Search
CPC ..... F21L 4/04; F21L 4/045; F21L 4/08; F21L 4/02; F21S 9/037; F21S 2/005
See application file for complete search history.

(56) References Cited

U.S. PATENT DOCUMENTS

| 4,045,663 A | 8/1977 | Young |
| 6,536,917 B1 | 3/2003 | Aperocho et al. |

(Continued)

FOREIGN PATENT DOCUMENTS

| GB | 2465339 A | 5/2010 | |
| WO | WO 2009137036 A1 * | 11/2009 | ............. F21S 9/032 |

OTHER PUBLICATIONS

PCT International Search Report PCT/IB2013/002261 dated Mar. 27, 2014, 5 pages.

*Primary Examiner* — Robert May
(74) *Attorney, Agent, or Firm* — Howard & Howard Attorneys PLLC

(57) ABSTRACT

A modular illumination assembly (10) includes at least two units, one of the at least two units presenting a first adaptor (42) and another of the at least two units presenting a second adaptor (56) to be assembled with one another and disassembled from one another along a common interface (46). One of the at least two units is a modular base unit (20) having an illumination device for illuminating an environment and a power supply electrically connected to the illumination device to supply power to the illumination device. Another of the at least two units is an accessory unit without a power supply that requires power to operate. The modular base unit (20) and the accessory unit are removably (Continued)

connectable mechanically and electrically with one another at the common interface (46) by the first adaptor (42) and the second adaptor (56) to provide power between the modular base unit (20) and the accessory unit.

20 Claims, 15 Drawing Sheets

Related U.S. Application Data

(60) Provisional application No. 61/712,320, filed on Oct. 11, 2012.

(51) Int. Cl.

| | | |
|---|---|---|
| *F21V 23/02* | (2006.01) | |
| *F21V 23/06* | (2006.01) | |
| *F21V 33/00* | (2006.01) | |
| *F21S 9/03* | (2006.01) | |
| *H02J 7/35* | (2006.01) | |
| *H01R 24/76* | (2011.01) | |
| *F21L 2/00* | (2006.01) | |
| *F21L 4/08* | (2006.01) | |
| *F21V 17/10* | (2006.01) | |
| *F21V 21/005* | (2006.01) | |
| *F21W 131/30* | (2006.01) | |
| *F21W 131/20* | (2006.01) | |
| *F21Y 115/10* | (2016.01) | |

(52) U.S. Cl.
CPC .............. *F21S 9/03* (2013.01); *F21S 9/037* (2013.01); *F21V 17/104* (2013.01); *F21V 21/005* (2013.01); *F21V 23/02* (2013.01); *F21V 23/06* (2013.01); *F21V 33/0052* (2013.01); *F21V 33/0056* (2013.01); *F21V 33/0064* (2013.01); *H01R 24/76* (2013.01); *H02J 7/355* (2013.01); *F21W 2131/20* (2013.01); *F21W 2131/30* (2013.01); *F21Y 2115/10* (2016.08)

(56) References Cited

U.S. PATENT DOCUMENTS

| | | | | |
|---|---|---|---|---|
| 6,585,393 | B1 | 7/2003 | Brandes et al. | |
| 6,682,203 | B2 | 1/2004 | Shiau | |
| 6,812,398 | B2 | 11/2004 | Yueh | |
| 7,287,873 | B2 * | 10/2007 | Galli | F21L 4/027 362/158 |
| 7,327,120 | B2 * | 2/2008 | Lin | H02J 7/0045 320/115 |
| 7,506,999 | B2 | 4/2009 | Uchida et al. | |
| 7,524,079 | B2 | 4/2009 | Greenhoe | |
| 7,563,001 | B2 * | 7/2009 | Bobbin | F21L 4/02 362/190 |
| 8,378,324 | B2 * | 2/2013 | Gardner | G01J 3/10 250/453.11 |
| 8,585,260 | B2 * | 11/2013 | Hajee | F21S 9/032 362/190 |
| 8,888,311 | B2 * | 11/2014 | Parsons | F21L 4/005 362/183 |
| 2002/0114155 | A1 | 8/2002 | Katogi et al. | |
| 2003/156408 | A1 | 8/2003 | Goodman | |
| 2006/0082991 | A1 * | 4/2006 | Hrabal | F21L 4/085 362/183 |
| 2006/0139001 | A1 | 6/2006 | Lin | |
| 2007/0184722 | A1 | 8/2007 | Doherty | |
| 2008/0030977 | A1 | 2/2008 | Bobbin et al. | |
| 2008/0198590 | A1 | 8/2008 | Kuo et al. | |
| 2008/0246416 | A1 | 10/2008 | Jones et al. | |
| 2010/0053942 | A1 | 3/2010 | Tarter et al. | |
| 2010/0104471 | A1 * | 4/2010 | Harmon | A61L 2/10 422/24 |
| 2011/0122609 | A1 | 5/2011 | Dahlin | |
| 2011/0228523 | A1 | 9/2011 | Zheng | |
| 2011/0234175 | A1 | 9/2011 | Hajee et al. | |
| 2011/0292643 | A1 | 12/2011 | Chen | |
| 2012/0026727 | A1 | 2/2012 | Hajee et al. | |
| 2012/0220256 | A1 * | 8/2012 | Tsuge | F21V 33/0056 455/343.1 |

\* cited by examiner

MODULAR ILLUMINATION ASSEMBLY HAVING A BASE UNIT AND AN ACCESSORY UNIT MECHANICALLY AND ELECTRICALLY CONNECTABLE TO THE BASE UNIT

CROSS-REFERENCE TO RELATED APPLICATION(S)

The present invention claims priority to provisional application No. 61/712,320, filed Oct. 11, 2012, and is a continuation-in-part application of Ser. No. 12/991,092, filed Jun. 30, 2011.

BACKGROUND OF THE INVENTION

1. Field of the Invention

The present invention relates generally to an illumination device, such as flash lights and the like and, more specifically, to a modular illumination assembly.

2. Description of the Related Art

Multiple places around the globe either have shortages in electricity supply or no electricity supply at all. Developing countries typically have fragile economies and experience serious environmental problems, which are associated with and negatively affect the use of energy, thereby making it as non affordable to people in need. Coal-fired and nuclear power stations for electricity generation, coal combustion in the townships, SASOL coal to oil processes, petrol and diesel use in vehicles for mass transportation, and over-exploitation of fuel wood resources all result in serious, long term environmental damage.

Many people in these developing world countries still depend on inefficient traditional energy sources. The most common type of fuel for cooking or lighting in low-income homes is kerosene or wood or other biomass such as dung and crop wastes. Burning of these types of material damages health and has been associated with respiratory diseases and eye problems.

Alluding to the above, land degradation and deforestation continue to grow as people in need of fuel sources cut down trees for cooking meals and illuminating their homes. Women and children spend many hours looking for wood; electricity could free up their time for other activities. Electric lighting could also extend study hours for children attending schools.

Prior art is replete with various illumination devices currently used by consumers. U.S. Pat. No. 7,506,999 to Uchida et al. teaches a lighting device that includes a light source in line and a reflector behind the light source. In front of the light source, a transparent inner lens and a transparent outer lens can be provided with a gap formed therebetween. The shape of the lens can be defined by bending a plate member so as to have a projection portion that surrounds or opens towards the light source. The inner lens and the outer lens can each have a flat part at a position opposite the light source and in the illumination direction. The light sources are fixedly arranged in a single lighting pattern wherein each of the light sources is not adjustable relative to one another.

As such, there is a constant need in the area of illumination devices for an improved light device that is cost effective, easy to manufacture, easy to transport, easy to assemble, and will eliminate one or more problems as set forth above. In addition, there is a need for accessories that do not have their own power supply to receive or supply power to another source.

As such, it is desirable to provide a modular illumination assembly including a modular base unit with one or more accessories that receive or supply power to the base unit. It is also desirable to provide one or more modular accessories that mate with the modular base unit. Therefore, there is a need in the art for a modular illumination assembly having a modular base unit with one or more accessories that meets at least one of these desires.

SUMMARY OF THE INVENTION

Accordingly, the present invention is a modular illumination assembly including at least two units, one of the at least two units presenting a first adaptor and another of the at least two units presenting a second adaptor to be assembled with one another and disassembled from one another along a common interface. One of the at least two units is a modular base unit having an illumination device for illuminating an environment and a power supply electrically connected to the illumination device to supply power to the illumination device. Another of the at least two units is an accessory unit without a power supply that requires power to operate. The modular base unit and the accessory unit are removably connectable mechanically and electrically with one another at the common interface by the first adaptor and the second adaptor to provide power between the modular base unit and the accessory unit.

One advantage of the present invention is to provide an illumination device is cost effective and easy to manufacture. Another advantage of the present invention is to provide an illumination device that is easily transportable, compact in its design and can be easily assembled and installed to provide illumination at various angles. Yet another advantage of the present invention is to provide an illumination device that can be manipulated by reducing or increasing the number of base units by mechanically mating the base units with one another as more light is required and disassembling the base units from one another to reduce illumination of the environment. Still another advantage of the present invention is to provide a cheap solution for every place in the world wherein electricity is in high demand and either not available or not affordable to some extent by everyone who needs it. A further advantage of the present invention is that the base unit can be worn on a persons head as a directional illuminating device. A head band is attached to the bracket as set forth above. Yet a further advantage of the present invention is the use of a bottle mount which is attached to the bracket as set forth above. The bottle mount allows the user to affix the illuminating device to a soft drink or water bottle whereby the bottle becomes a stand. A still further advantage of the present invention is that the modular illumination assembly includes a modular base unit having one or more accessories without a power supply that receive or supply power to the base unit.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
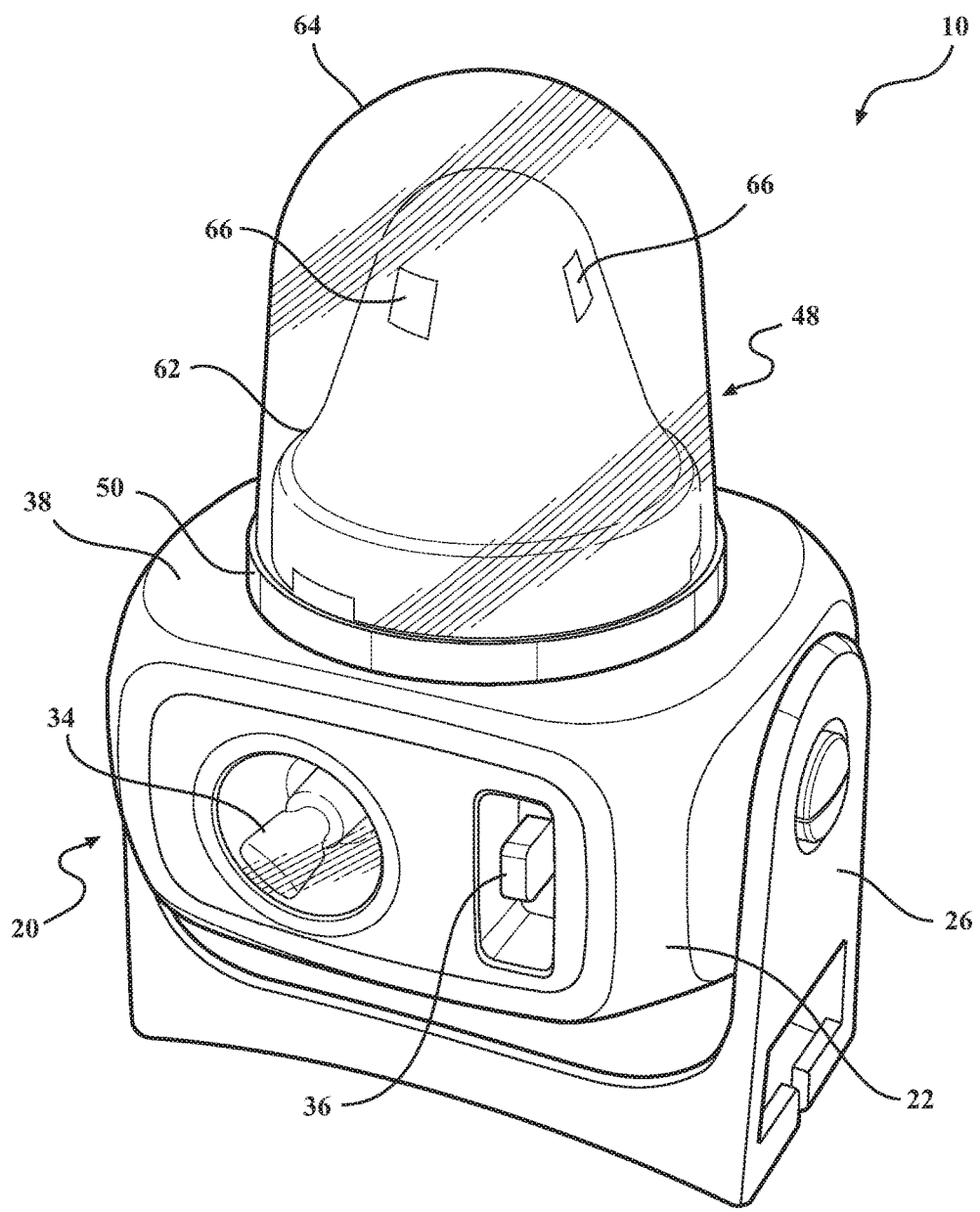
FIG. 1 is a perspective view of a modular illumination assembly, according to one embodiment of the present invention, illustrating a modular base unit having an illumination accessory.
Figure 2:
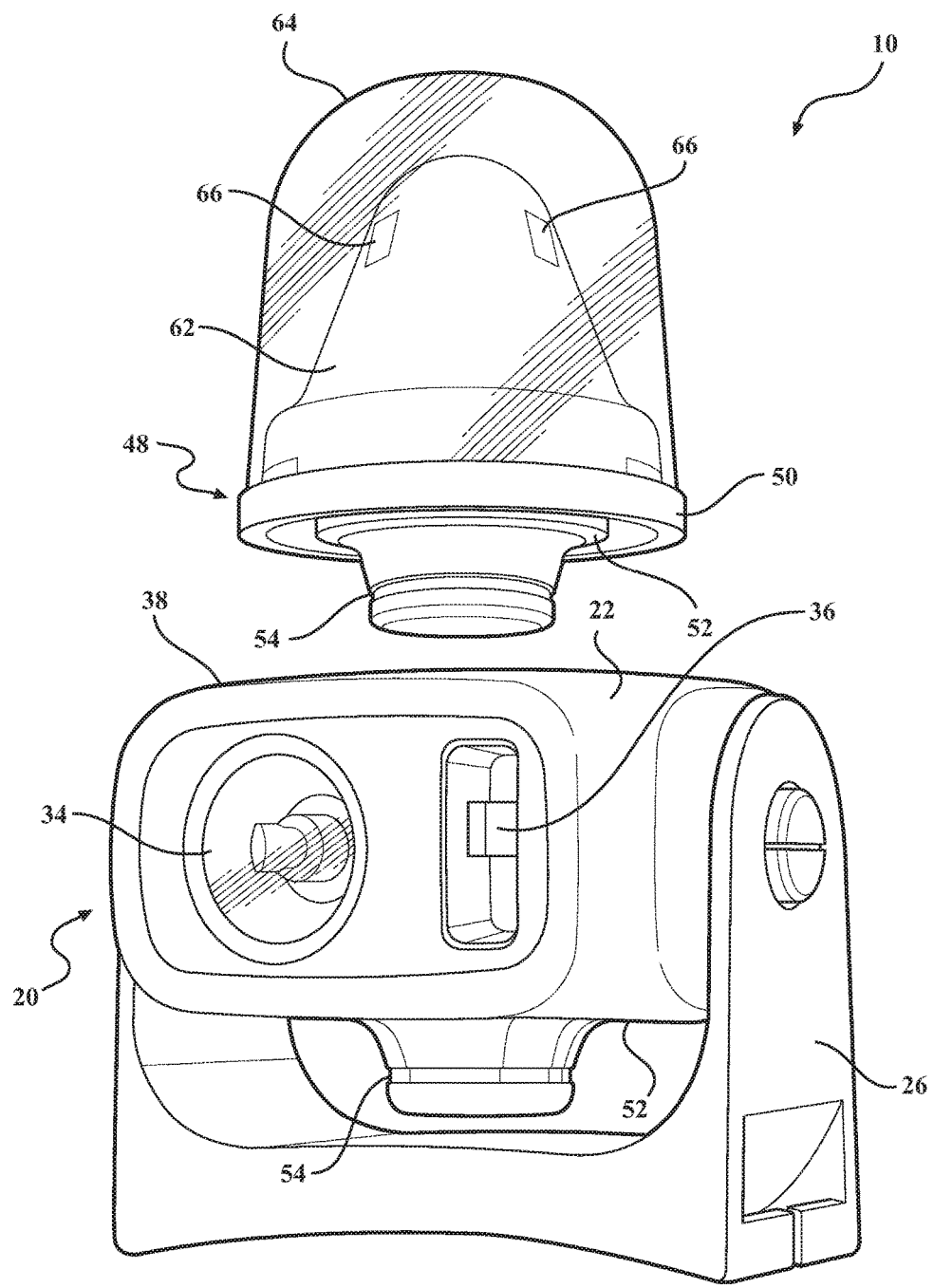
FIG. 2 is a perspective view of the illumination accessory in exploded relationship to the modular base unit of FIG. 1.
Figure 3:
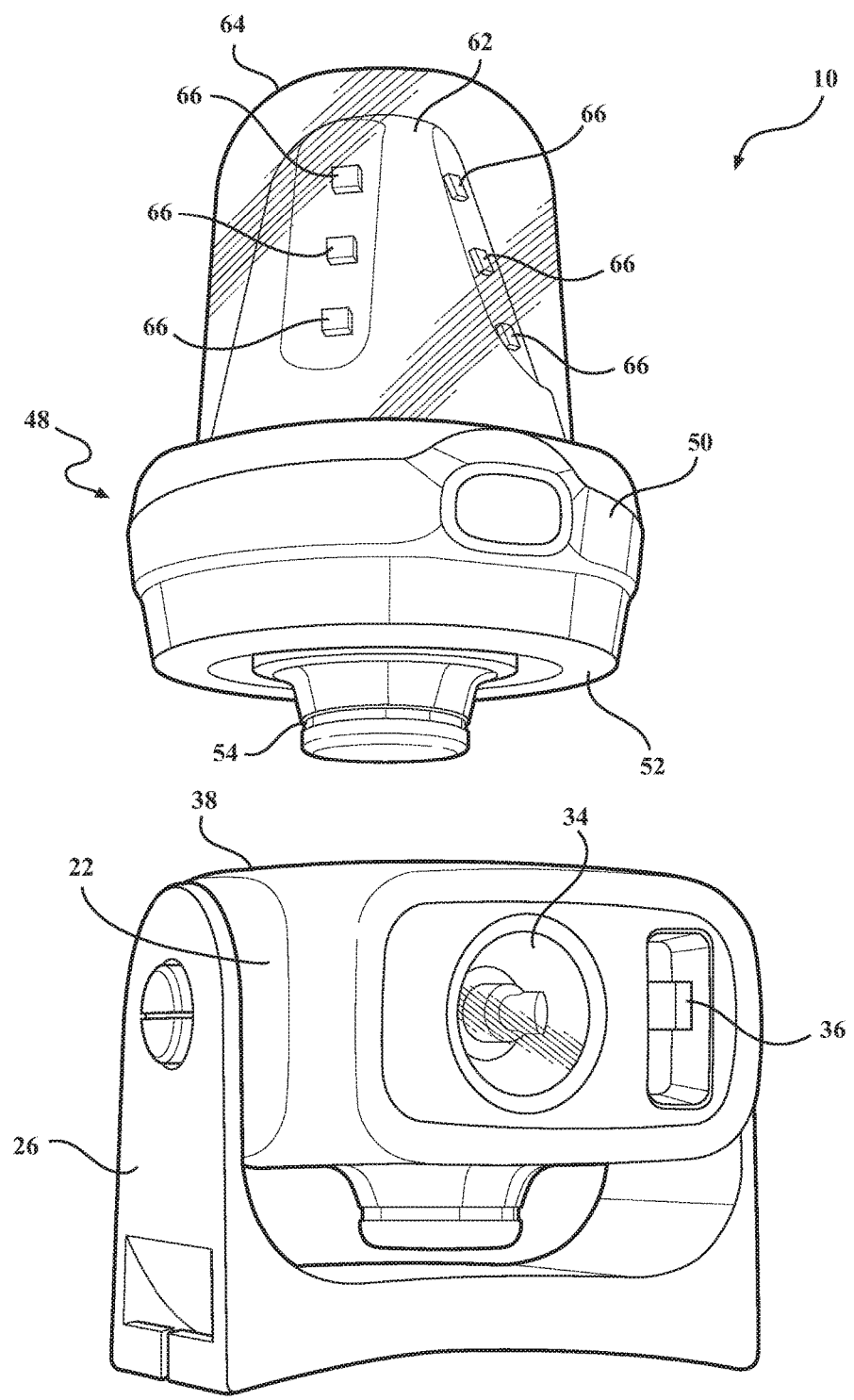
FIG. 3 is another perspective view of the illumination accessory in exploded relationship to the modular base unit of FIG. 1.
Figure 4:
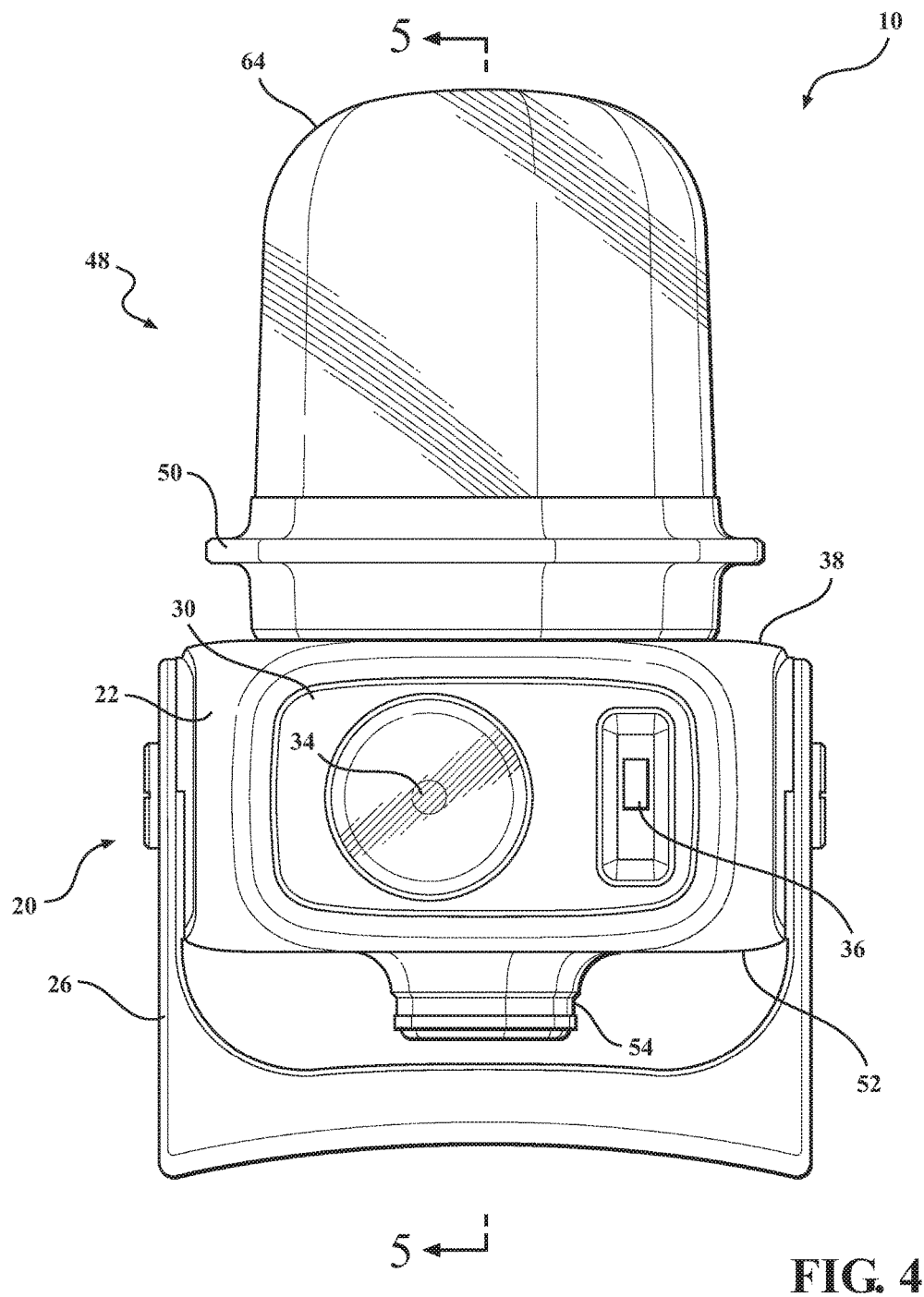
FIG. 4 is a front view of the modular base unit with the illumination accessory of FIG. 1.

Referring to the Figures, wherein like numerals indicate like or corresponding parts throughout several views, one embodiment of a modular illumination assembly 10 is generally shown in FIGS. 1-5A. The modular illumination assembly 10 includes a modular base unit, generally indicated at 20. The modular base unit 20 includes a housing 22 defining a housing chamber 24. The modular base unit 20 further includes a bracket 26 rotatably coupled to the housing 22. The housing 22 is substantially rectangular in configuration. However, it is to be appreciated that the housing 22 can be any suitable configuration. The modular base unit 20 is of a type disclosed in U.S. Patent Application. Publication No. 2012/0026727, published Feb. 2, 2012, the disclosure of which is hereby incorporated by reference.

The modular base unit 20 includes one or a plurality of batteries 28 disposed in the housing chamber 24 and fixed to the housing 22. More specifically, the illustrated modular base unit 20 includes three rechargeable batteries 28. It is to be appreciated that the one or more rechargeable batteries 28 may be any suitable type of energy sources for powering the modular base unit 20. It is to be further appreciated that the modular base unit 20 is not limited to a configuration of three rechargeable batteries 28 and may have one or any suitable number of rechargeable batteries 28.

The housing 22 defines a front panel cavity. The modular base unit 20 includes a front panel 30 disposed in the front panel cavity and fixed to the housing 22. The front panel 30 defines an LED aperture and a switch aperture.

The modular base unit 20 includes a printed circuit board 32 disposed in the housing chamber 24 and fixed to the housing 22. The printed circuit board 32 is in electrical communication with the rechargeable batteries 28. The modular base unit 20 includes a light emitting diode (LED) 34 mounted to the printed circuit board 32 and extending through the LED aperture. The modular base unit 20 also includes a switch 36 mounted to the printed circuit board 32 and extending through the switch aperture. The switch 36 is in electrical communication with the printed circuit board 32. The switch 36 is further in electrical communication with the plurality of rechargeable batteries 28 and the LED 34 through the printed circuit board 32. It should also be appreciated that the illumination or light device of the present invention is used for illuminating an environment, such as a room, a class room, and the like, wherein electricity is in high demand and either not available or not affordable to some extent.

Figure 5:
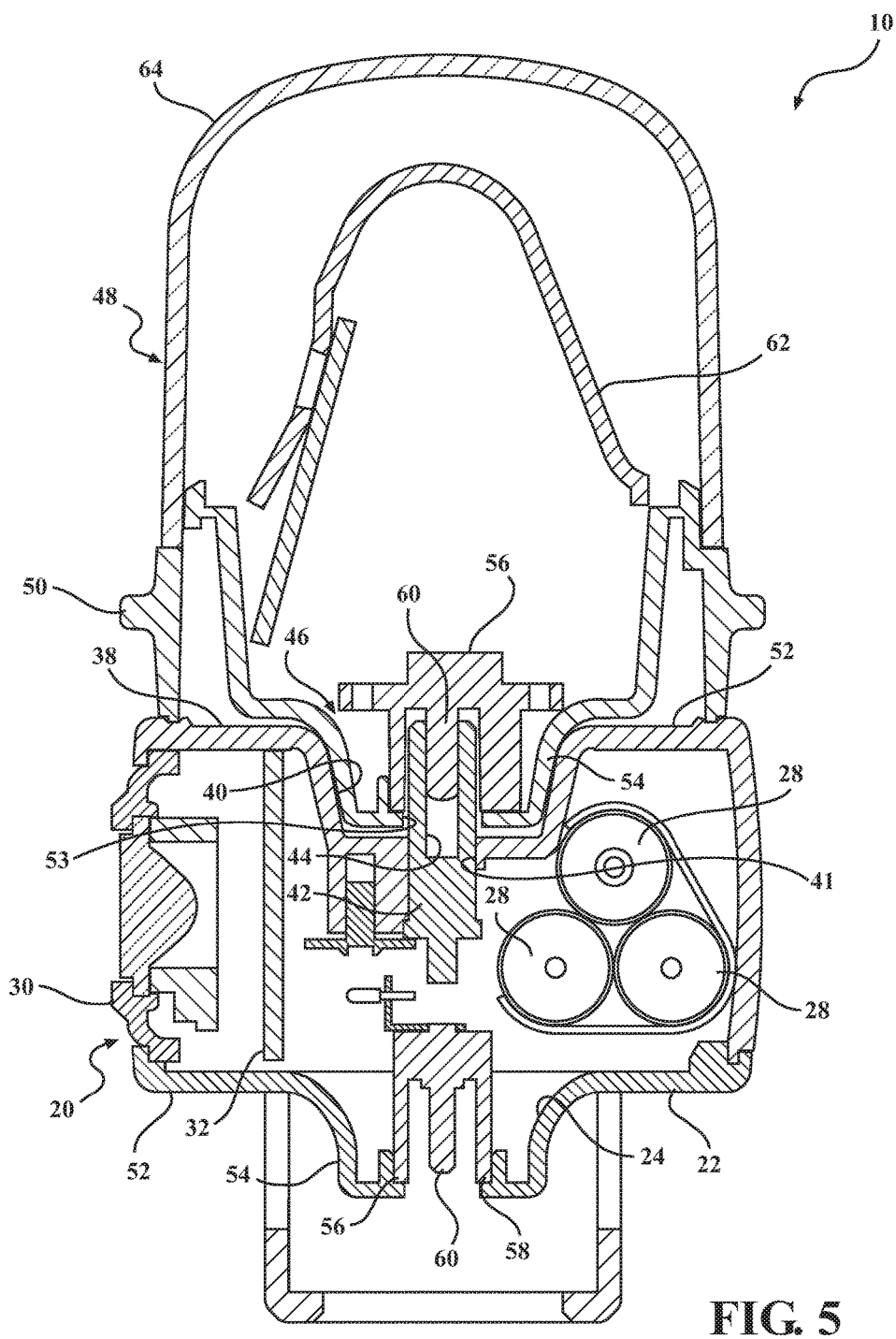
FIG. 5 is a sectional view taken along line 5-5 of FIG. 4.
Figure 5A:
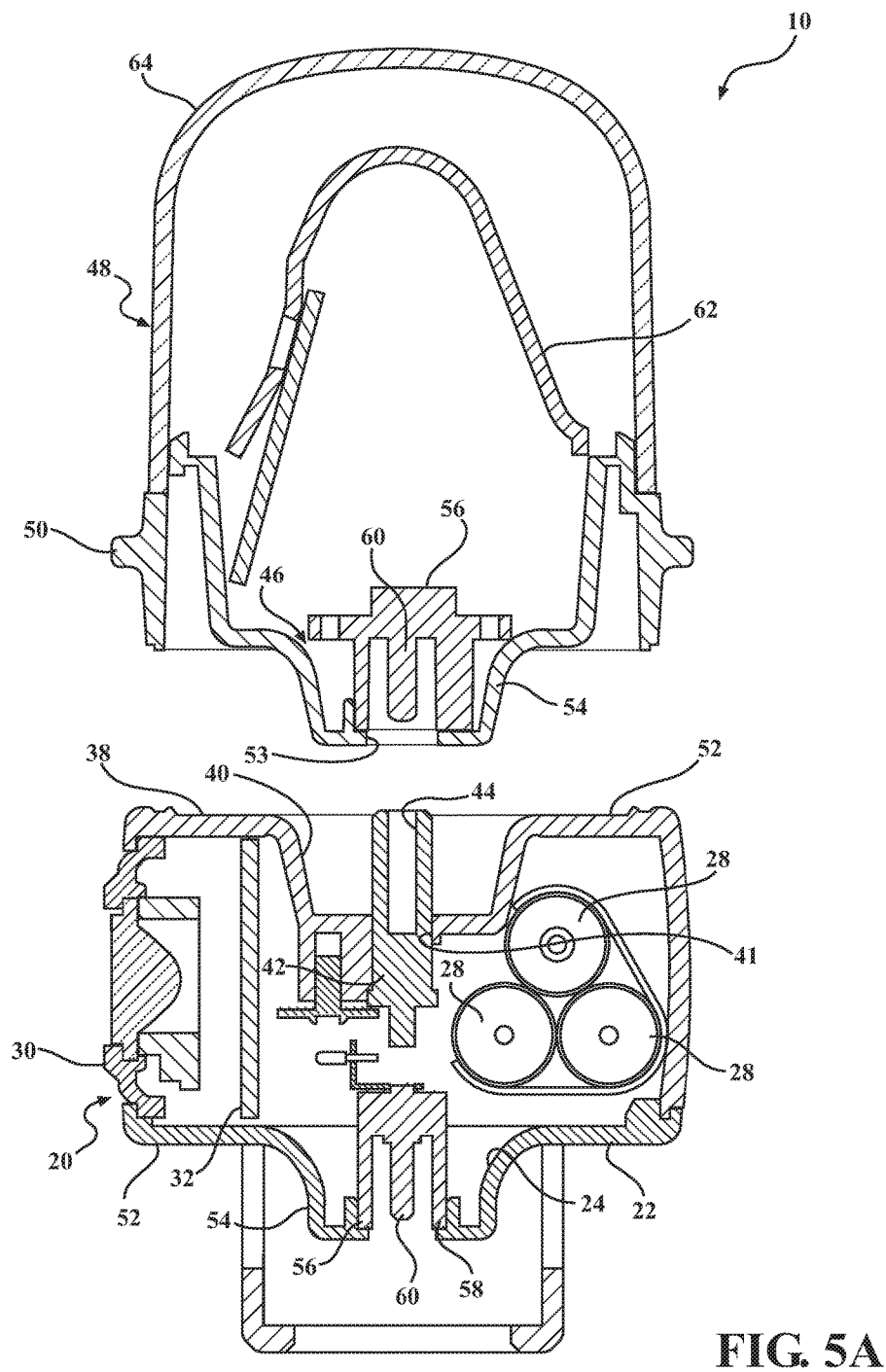
FIG. 5A is a view similar to FIG. 5 illustrating the illumination accessory in exploded relationship to the modular base unit.

Referring specifically to FIG. 5, the housing 22 has a top wall 38 and defines a depression 40 extending into the housing chamber 24 with a substantially cylindrical configuration. The top wall 38 defines a first adaptor aperture 41 extending through the housing 22 into the depression 40. The housing 22 further has a first adaptor 42 disposed in the first adaptor aperture 41 and fixed to the top wall 38. The first adaptor 42 defines a rod aperture 44. The first adaptor 42 and the depression 40 partially define a common interface 46. It is to be appreciated that the depression 40 can be any suitable configuration.

The modular illumination assembly 10 includes one or more accessory units capable of interfacing with the modular base unit 20. Each of the accessory units includes a second housing 50. The second housing 50 has a bottom wall 52 and a protrusion 54 extending from the bottom wall 52 with a substantially cylindrical configuration. The bottom wall 52 defines a second adaptor aperture 53 extending through the protrusion 54 into the second housing 50. Each of accessory units has a second adaptor 56 disposed in the second adaptor aperture 53 extending into the second housing 50 and fixed to the bottom wall 52. The second adaptor 56 defines a socket 58 extending to a distal end. The second adaptor 56 further has a rod 60 extending into the socket 58. The rod 60 does not extend beyond the distal end of the socket 58. The second adaptor 56 and the protrusion 54 further partially define the common interface 46. It is to be appreciated that the protrusion 54 can be any suitable configuration to mate with the depression 40. It is to be further appreciated that the modular base unit 20 has the same bottom wall 52 and protrusion 54 configurations as well as the same second adaptor 56. It should be additionally appreciated that the common interface 46 can be inversely configured with the modular base unit 20 including the protrusion 54 and the second adaptor 56 and the accessory unit including the depression 40 and the first adaptor 42.

The modular base unit 20 is mated with each of the accessory units at the common interface 46. The protrusion 54 of the accessory unit is disposed in the depression 40 of the modular base unit 20. The first adaptor 42 of the modular base unit 20 is disposed in the second adaptor 56 of the accessory unit. The rod 60 of the second adaptor 56 is disposed in the rod aperture 44 of the first adaptor 42. The first adaptor 42 is in electrical communication with the second adaptor 56. The common interface 46 allows the modular base unit 20 to mechanically and electronically connect to each of the accessory units. The switch 36 of the modular base unit 20 is moveable along the printed circuit board 32 between a plurality of positions to, in one embodiment, control the operation of the modular base unit 20 and the accessory unit. It is to be appreciated that the switch 36 of the modular base unit 20 may or may not control the accessory unit.

A first embodiment of one of the accessory units disclosed is an illumination accessory, generally indicated at 48. In the first embodiment of the accessory unit, the illumination accessory 48 is mated to the modular base unit 20 at the common interface 46. The illumination accessory 48 has an illumination shell 62 and a protective shell 64. The illumination shell 62 is fixed to the illumination accessory 48 and is reflective. The protective shell 62 is fixed to the illumination accessory 48 and disposed around the illumination shell 62. The protective shell 62 can be reflective. The illumination accessory 48 further has one or a plurality of LEDs 66 fixed to the illumination shell 62. The one or more LEDs 66 are in electrical communication with the second adaptor 56 of the illumination accessory 48. The one or more LEDs 66 are in further electrical communication with the rechargeable batteries 28 of the modular base unit 20 through the first and second adaptors 42, 56 at the common interface 46. It should be appreciated that the one or more LEDs 66 of the illumination accessory 48 may have any suitable number of LEDs 66 or may be a single LED 66.

The illumination accessory 48 is capable of using energy stored in the rechargeable batteries 28 of the modular base unit 20 to operate the one or more LEDs 66 of the illumination accessory 48. The light from the one or more LEDs 66 is reflected by the illumination shell 62 away from the illumination accessory 48.

Figure 6:
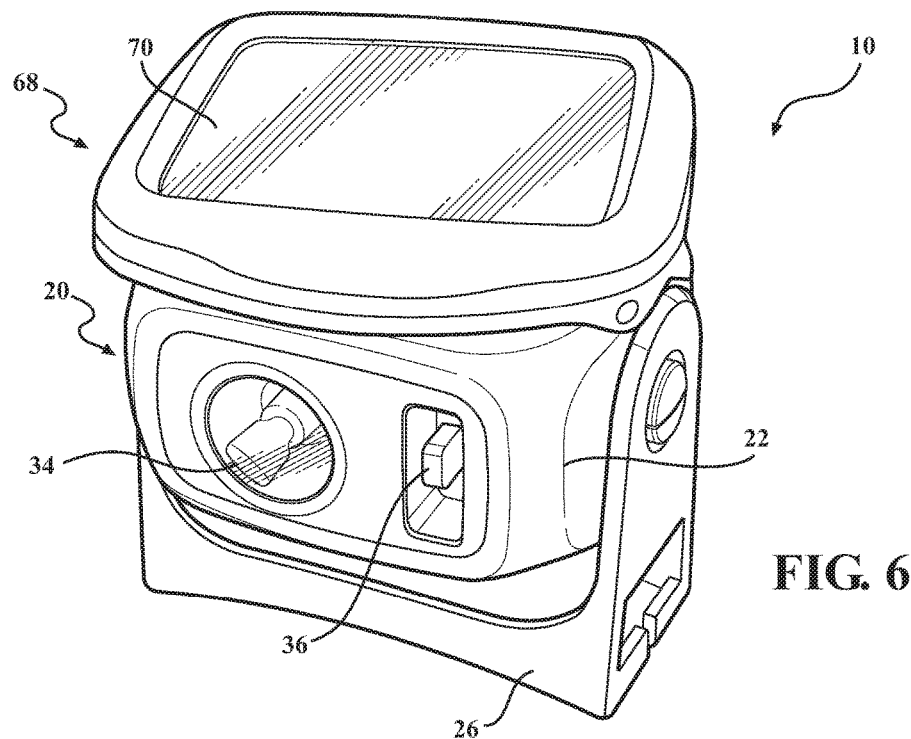
FIG. 6 is a perspective view of another embodiment, according to the present invention, of the modular illumination assembly of FIG. 1 illustrating the modular base unit with a solar charging accessory.
Figure 7:
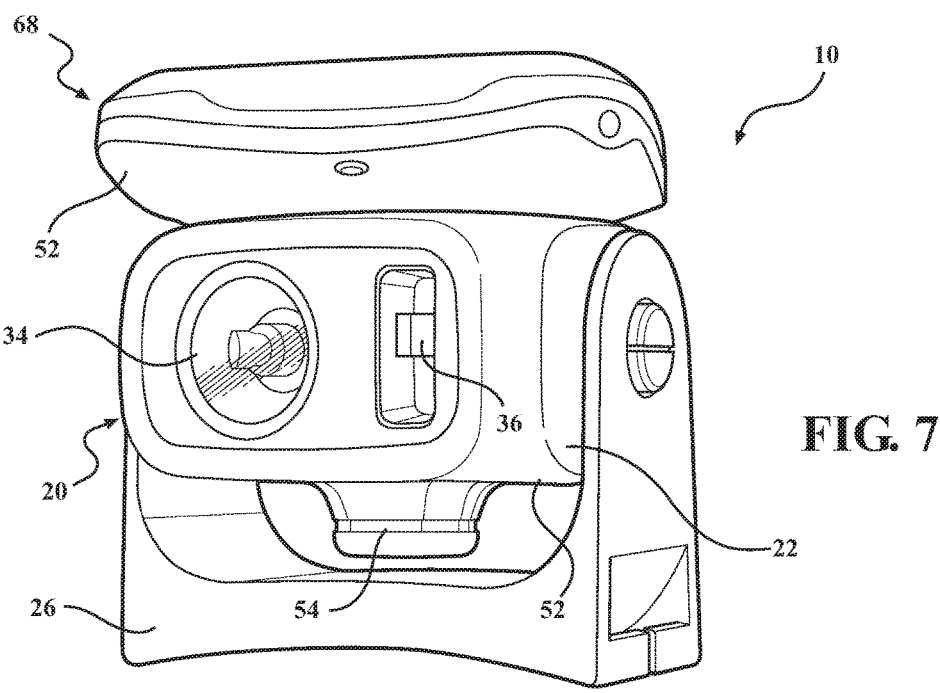
FIG. 7 is a perspective view of the modular illumination assembly of FIG. 6 illustrating the modular base unit with a solar charging accessory.
Figure 8:
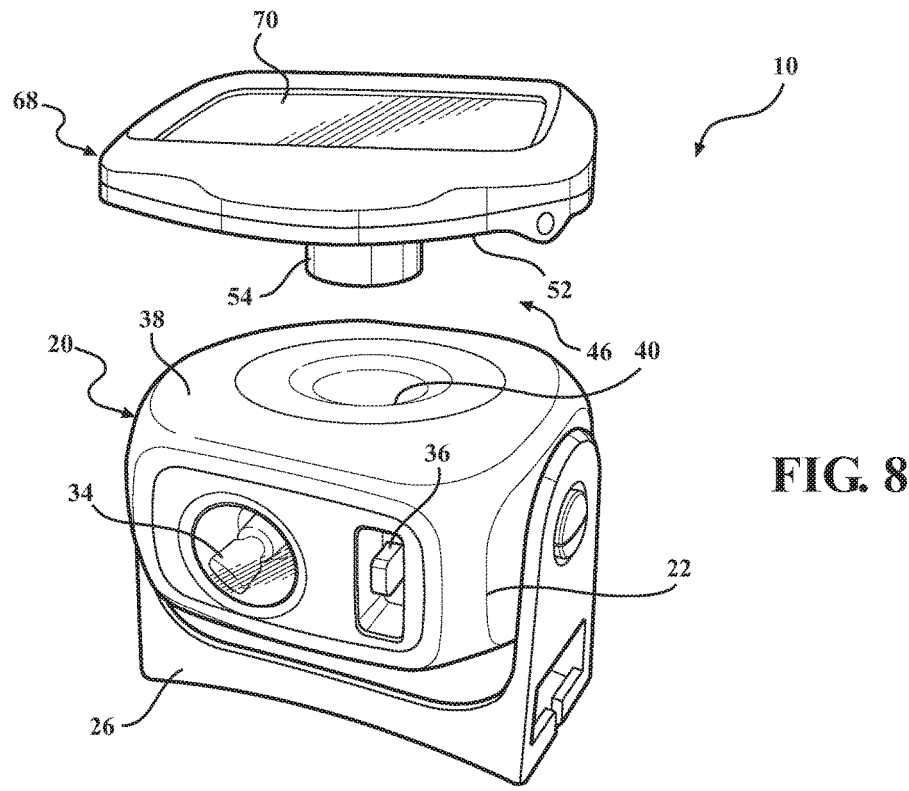
FIG. 8 is another perspective view of the solar charging accessory in exploded relationship to the modular base unit of FIG. 6.

Referring to FIGS. 6-8, a second embodiment of the accessory units disclosed is a solar charging accessory, generally indicated at 68, mated to the modular base unit 20 at the common interface 46. The solar charging accessory 68 has a top surface and a solar panel 70 fixed to the top surface. The solar panel 70 is in electrical communication with the second adaptor 56 of the solar charging accessory 68. The solar panel 70 is in further electrical communication with the rechargeable batteries 28 of the modular base unit 20 through the first and second adaptors 42, 56 at the common interface 46. The solar panel 70 of the solar charging accessory 68 is capable of converting light into energy to be stored in the rechargeable batteries 28 of the modular base unit 20. The solar panel 70 of the solar charging accessory 68 is further capable of converting light into energy to operate the LED 34 of the modular base unit 20.

Figure 9:
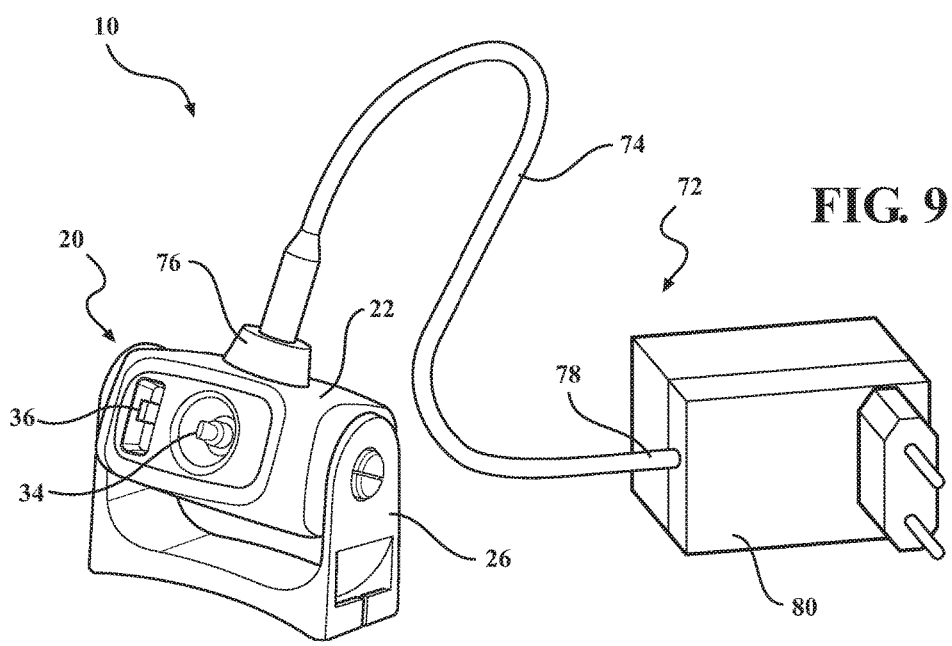
FIG. 9 is a perspective view of yet another embodiment, according to the present invention, of the modular illumination assembly of FIG. 1 illustrating the modular base unit with an adaptor charging accessory.

Referring to FIG. 9, a third embodiment of the accessory units disclosed is an adaptor charging accessory, generally indicated at 72, mated to the modular base unit 20 at the common interface 46. More specifically, the adaptor charging accessory 72 is an AC voltage adapter. The adaptor charging accessory 72 has a cable 74 with a first end 76 and a second end 78. The adaptor charging accessory 72 further has a second adaptor 56 at the first end 76. The adaptor charging accessory 72 also has a power source adaptor 80 at the second end 78. More specifically, the power source adaptor 80 is a transformer for converting AC voltage into the DC voltage. Moreover, the power source adaptor 80 is in electrical communication with an external power source and the second adaptor 56 of the adaptor charging accessory 72 through the cable 74. The power source adaptor 80 is in further electrical communication with the rechargeable batteries 28 of the modular base unit 20 through the first and second adaptors 42, 56 at the common interface 46.

The adaptor charging accessory 72 is capable of converting the AC voltage into DC voltage with the power source adapter 86 to be stored in the rechargeable batteries 28 of the modular base unit 20 using the external power source. The adaptor charging accessory 72 is further capable of converting the AC voltage into DC voltage with the power source adapter 86 to operate the LED 34 of the modular base unit 20.

Figure 10:
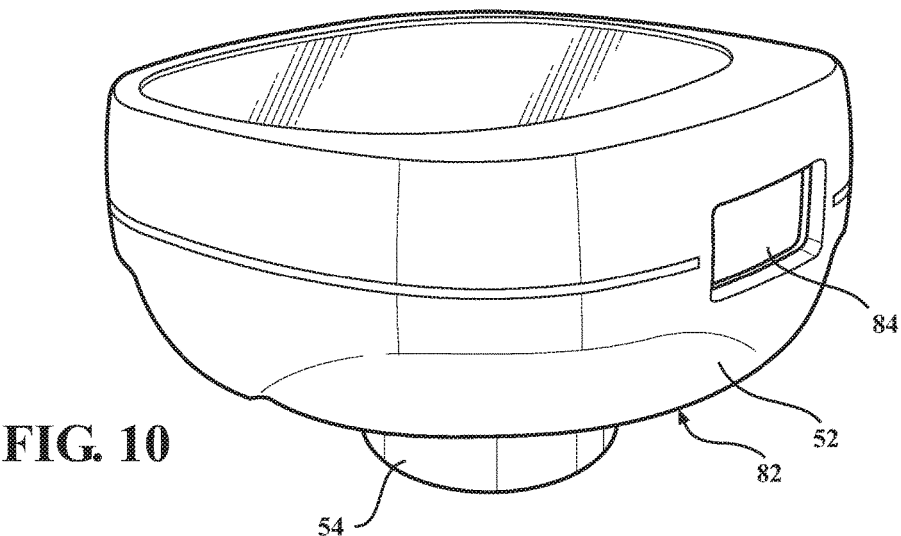
FIG. 10 is a perspective view of a portable electronic charging accessory for still another embodiment, according to the present invention, of the modular illumination assembly of FIG. 1.
Figure 11:
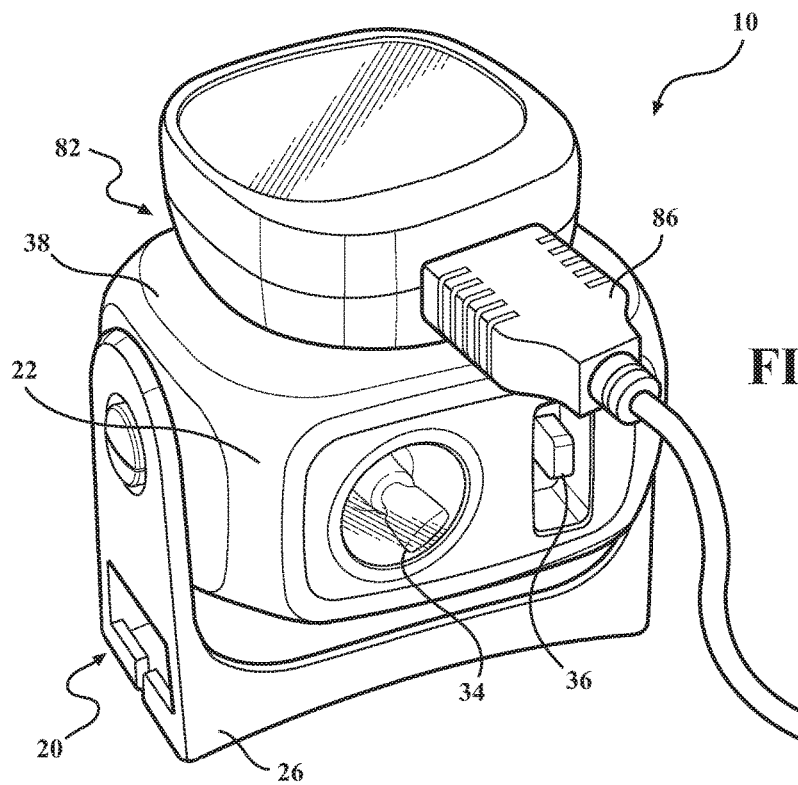
FIG. 11 is a perspective view of the modular base unit of FIG. 1 with the portable electronic charging accessory of FIG. 10.
Figure 12:
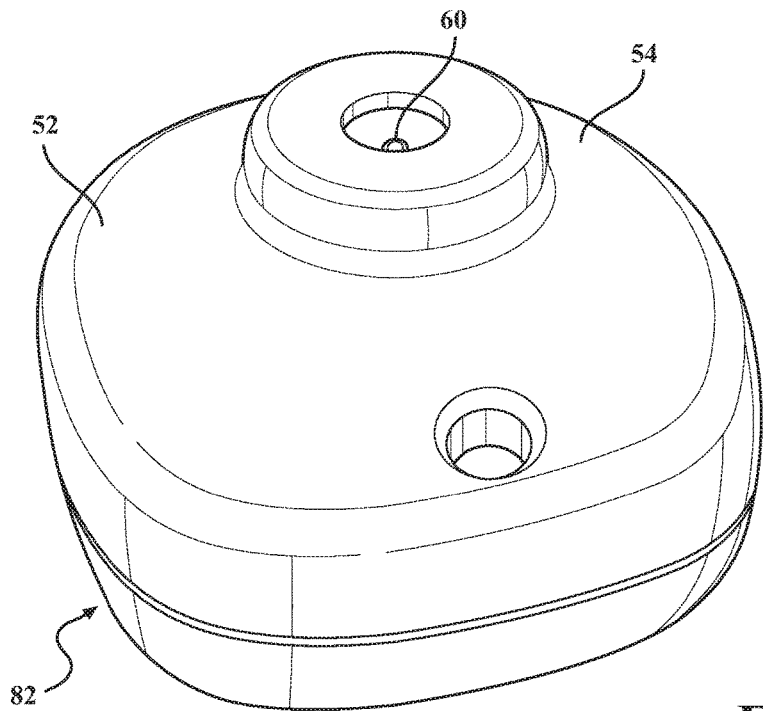
FIG. 12 is a perspective view of the bottom of the portable electronic charging accessory of FIG. 10.

Referring to FIGS. 10-12, a fourth embodiment of the accessory units disclosed is a portable electronic charging accessory, generally indicated at 82, mated to the modular base unit 20 at the common interface 46. The portable electronic charging accessory 82 has an electronic adaptor 84 for connecting electronic devices (not shown) to the modular base unit 20. More specifically, the electronic adaptor 84 is a USB port capable of connecting electronic devices through a USB cable 86.

The electronic adaptor 84 is in electrical communication with the second adaptor 56 of the portable electronic charging accessory 82. The electronic adaptor 84 is in further electrical communication with the rechargeable batteries 28 of the modular base unit 20 through the first and second adaptors 42, 56 at the common interface 46. The portable electronic charging accessory 82 is capable of transferring energy stored in the rechargeable batteries 28 of the modular base unit 20 to electronic devices through the electronic adaptor 84 and the USB cable 86. The portable electronic charging accessory 82 is capable of charging electronic devices such as, but not limited to, mobile phones, PDAs, tablets, and MP3 players.

Figure 13:
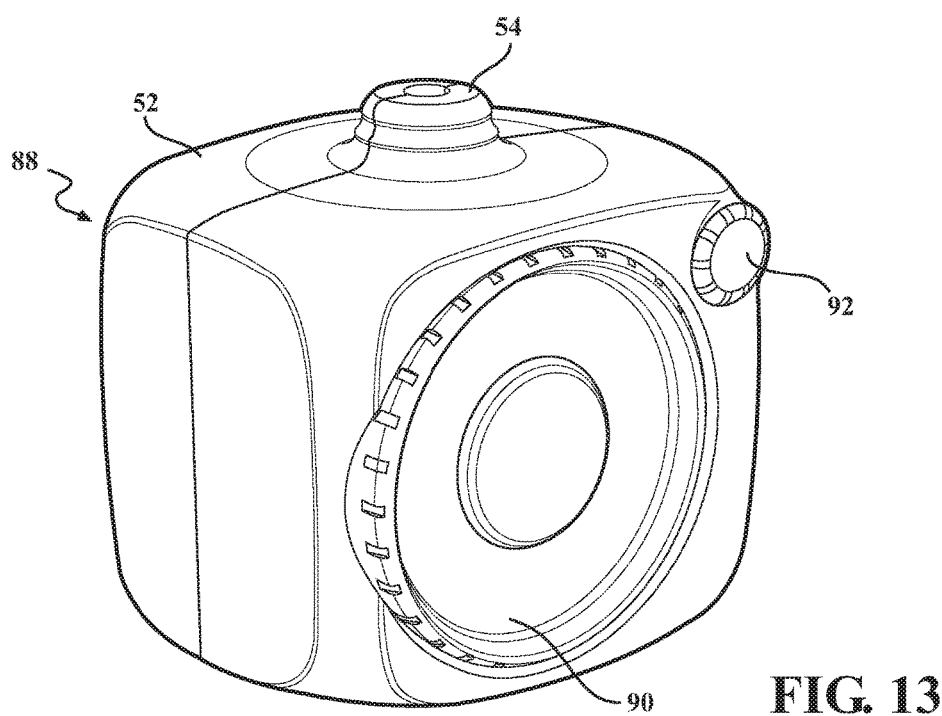
FIG. 13 is a perspective view of a media accessory for a further embodiment, according to the present invention, of the modular illumination assembly of FIG. 1.
Figure 14:
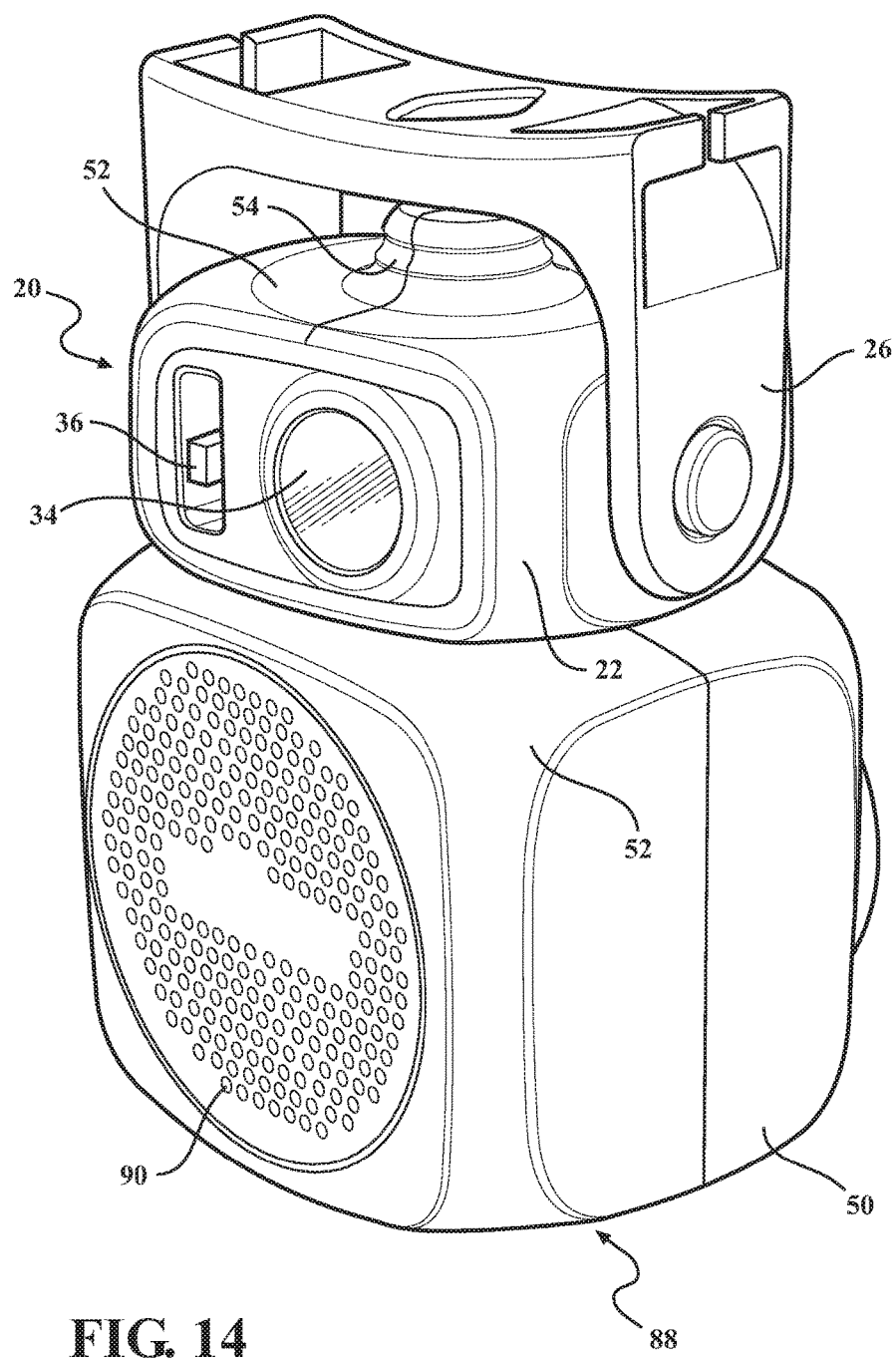
FIG. 14 is a perspective view of the modular illumination assembly illustrating the modular base unit mounted to the media accessory of FIG. 13.

Referring to FIGS. 13-14, a fifth embodiment of the accessory units disclosed is a media accessory, generally indicated at 88, mated to the modular base unit 20 at the common interface 46. More specifically, the media accessory 88 is a radio having a receiver and at least one speaker 90. The media accessory 88 further has a radio switch 92 in electrical communication with the second adaptor 56 of the media accessory 88. The radio switch 92 is further in electrical communication with the receiver and the at least one speaker 90. The radio switch 92 is additionally in electrical communication with the modular base unit 20 through the first and second adaptors 42, 56 at the common interface 46. The media accessory 88 is capable of receiving radio signals through the receiver and converting the radio signals into audible noises through the at least one speaker 90. The radio switch 92 controls the operation and the volume of the media accessory 88. The media accessory 88 is capable of transferring energy stored in the rechargeable batteries 28 of the modular base unit 20 to operate the receiver and at least one speaker 90.

Figure 15:
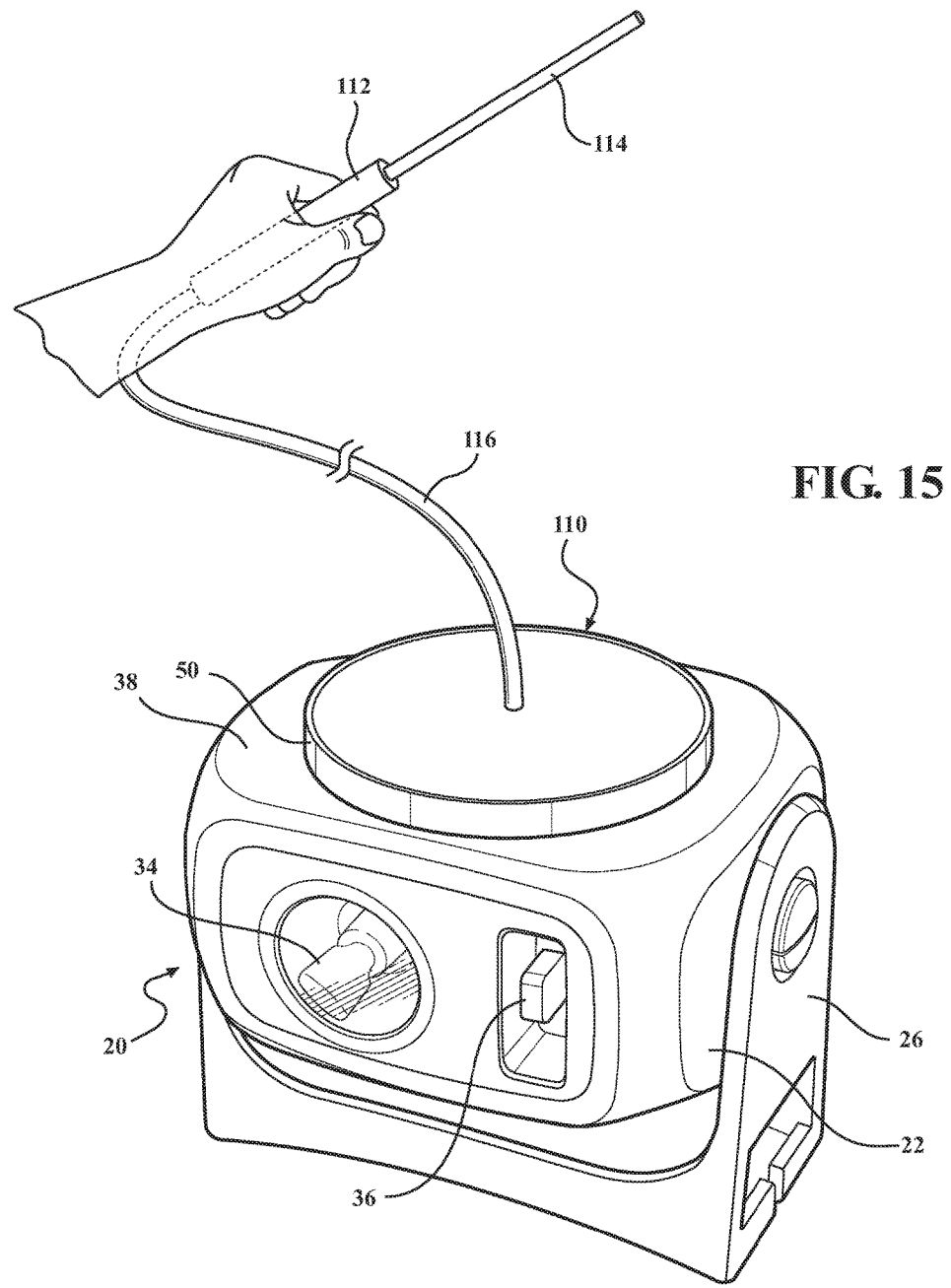
FIG. 15 is a perspective view of another embodiment, according to the present invention, of the modular illumination assembly illustrating the modular base unit with a sterilization accessory.
Figure 16:
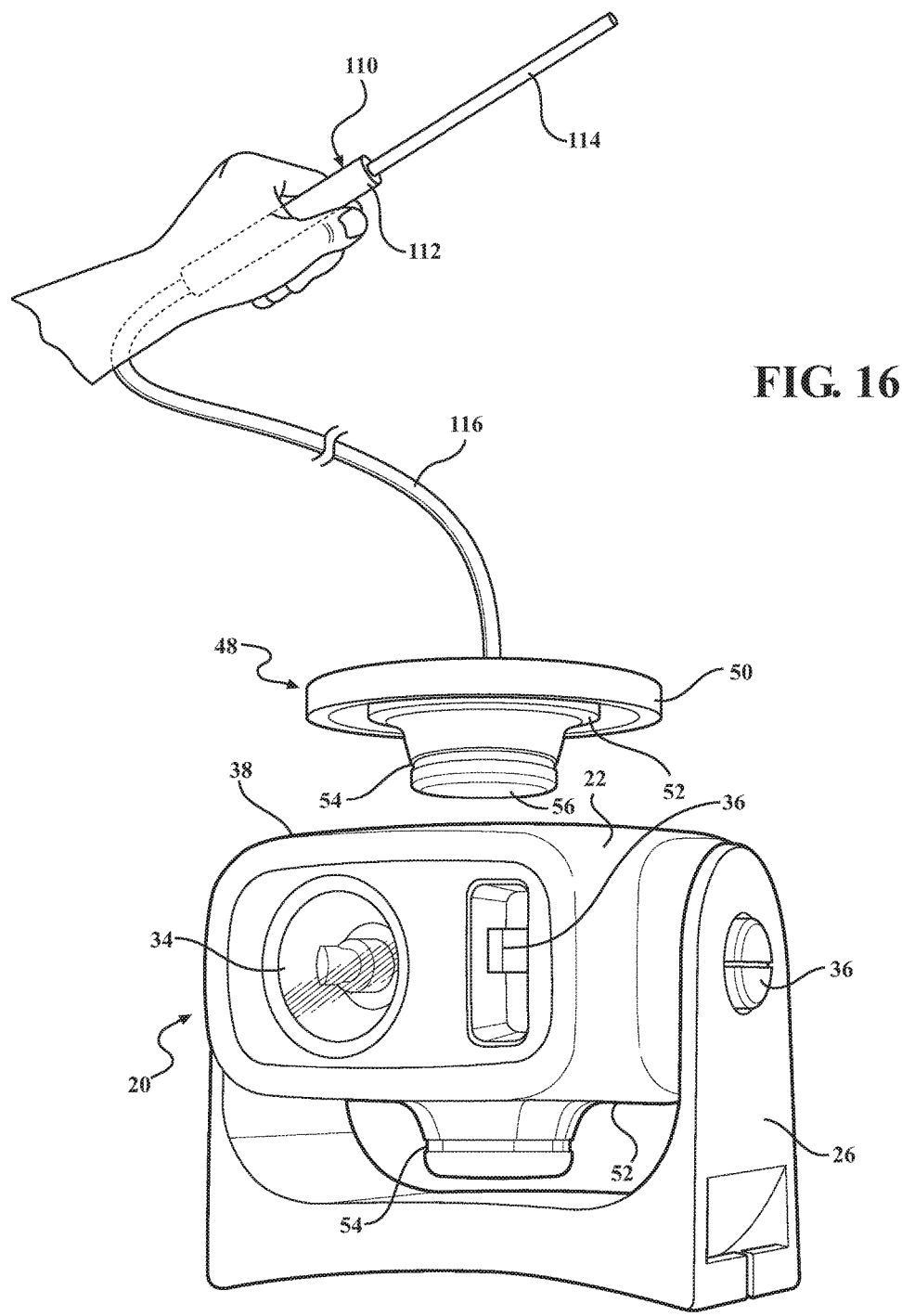
FIG. 16 is a perspective view of the sterilization accessory in exploded relationship to the modular base unit of FIG. 15.

Referring to FIGS. 15 and 16, a sixth embodiment of the accessory units disclosed is a sterilization device, generally indicated at 110, mated to the modular base unit 20 at the common interface 46. More specifically, the sterilization device 110 is an UV sterilization device. The sterilization device 110 has a handle 112 with a primary end and a secondary end. The second adaptor 56 of the sterilization device 110 is disposed in the primary end of the handle 112. The sterilization device 110 further has a UV illumination wand 114 extending from the secondary end of the handle 112. As the handle 112 of the sterilization device 110 is mounted to the modular base unit 20 at the common interface 46, the sterilization device 110 is in electrical communication with the rechargeable batteries 28 of the modular base unit 20 through the first and second adaptors 42, 56. The sterilization device 110 is capable of transferring energy stored in the rechargeable batteries 28 of the modular base unit 20 to the sterilization device to operate the UV illumination wand. The UV illumination wand is capable of being disposed into water to sterilize the water. In this contemplated embodiment, the sterilization device would not have its own battery.

In another embodiment, the sterilization device 110 can have a battery disposed in the handle 112 with the battery in electrical communication with the second adaptor 56 and the UV illumination wand 114. As the handle 112 of the sterilization device 110 is mounted to the modular base unit 20 at the common interface 46, the sterilization device 110 is in electrical communication with the rechargeable batteries 28 of the modular base unit 20 through the first and second adaptors 42, 56. The sterilization device 110 is capable of transferring energy stored in the rechargeable batteries 28 of the modular base unit 20 to the battery of the sterilization device 110. The sterilization device 110 is capable of detaching from the modular base unit 20 to dispose the UV illumination wand into water to sterilize the water.

In another embodiment, the sterilization device 110 has a cable 116 with a first end and a second end. The sterilization device 110 further has a second adaptor 56 at the first end of the cable 116. The second end of the cable 116 is fixed to the primary end of the handle 112 and is in electrical communication with the UV illumination wand 114. Moreover, the UV illumination wand 114 is in electrical communication with the second adaptor 56 of the sterilization device 110 through the cable 116.

As the second adaptor 56 of the cable 116 is mounted to the modular base unit 20 at the common interface 46, the UV illumination wand 114 is in further electrical communication with the rechargeable batteries 28 of the modular base unit 20 through the first and second adaptors 42, 56 at the common interface 46 to the sterilization device 110 to operate the UV illumination wand 114. The UV illumination wand 114 is capable of being disposed into water to sterilize the water.

Figure 17:
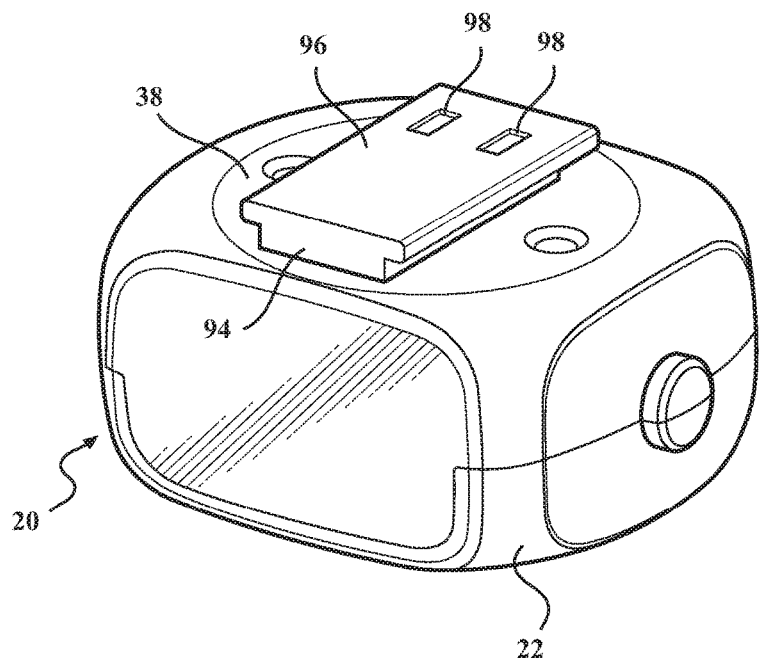
FIG. 17 is a perspective view of yet another embodiment, according to the present invention, of the modular illumination assembly of FIG. 1 illustrating the modular base unit having another embodiment of an attachment mechanism.
Figure 18:
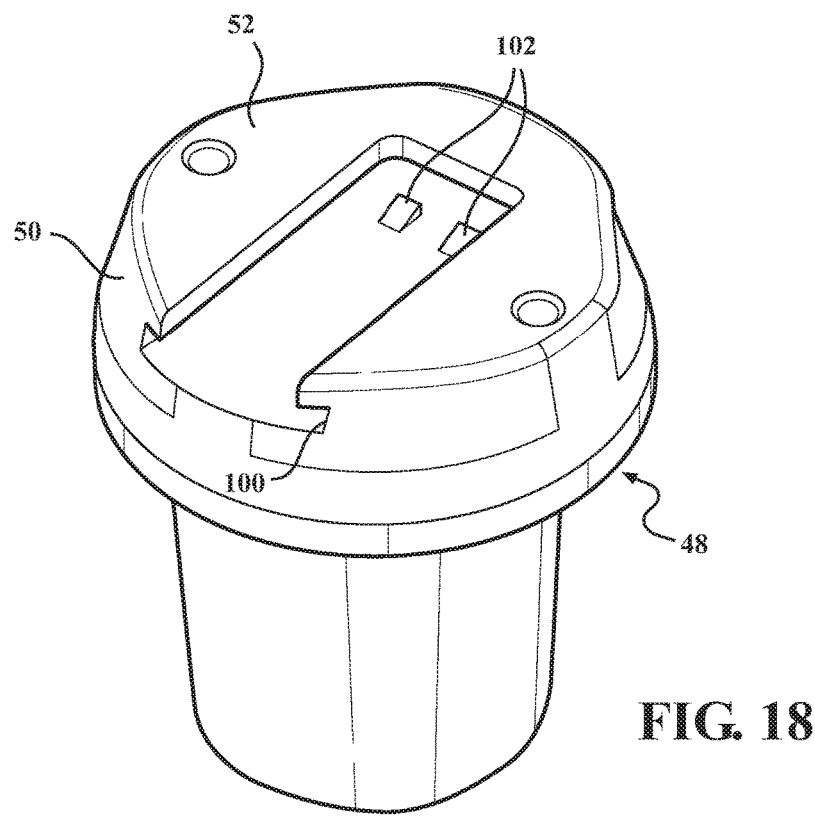
FIG. 18 is a perspective view of yet another embodiment, according to the present invention, of the modular illumination assembly of FIG. 1 illustrating the illumination accessory having another embodiment of an attachment mechanism.
Figure 19:
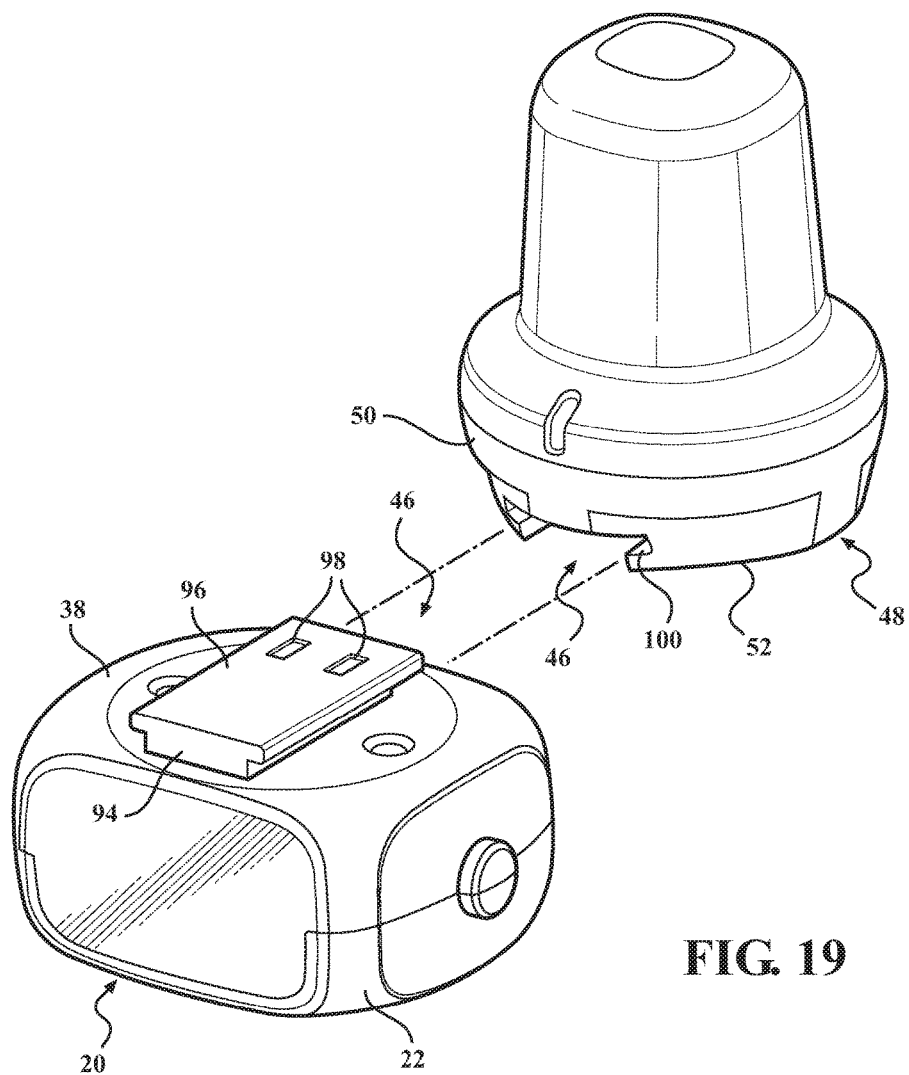
FIG. 19 is an exploded perspective view of the modular illumination assembly illustrating the modular base unit and illumination accessory of FIGS. 17 and 18.

Another embodiment of the common interface 46 is shown in FIGS. 17-19. The modular base unit 20 has another embodiment of the attachment mechanism. As shown, the attachment mechanism has a raised portion 94 with a substantially T-shaped configuration. The raised portion 94 extends from the top wall 38. The raised portion 94 has a pad surface 96 and a plurality of pads 98. More specifically the plurality of pads 98 are two pads 98. The plurality of pads 98 are in electrical communication with the rechargeable batteries 28 of the modular base unit 20. It is to be appreciated that the plurality of pads 98 can be any suitable number of pads of any suitable configuration.

The accessory unit, such as the illumination accessory 48, includes another embodiment of the attachment mechanism. As illustrated, the bottom wall 52 defines a slot 100 with a substantially T-shaped configuration. The slot 100 extends into the second housing 50. The slot 100 has a mating configuration with the raised portion 94 of the modular base unit 20. The accessory unit further has one or more tabs 102 extending into the slot 100. More specifically, as illustrated, there are two tabs 102. The tabs 102 are in electrical communication with a feature or device of the accessory units. As illustrated, the tabs 102 are in electrical communication with the one or more LEDs 66 of the illumination accessory 48. It is to be appreciated that the raised portion 94 and the slot 100 may be of any suitable any mating configuration or shape.

In operation, the slot 100 of the illumination accessory 48 is slid over and mated with the raised portion 94 of the modular base unit 20 at the common interface 46. The tabs 102 of the illumination accessory 48 abut the pads 98 of the modular base unit 20. The one or more LEDs 66 of the illumination accessory 48 are in electrical communication with the rechargeable batteries 28 of the modular base unit 20 through the pads 98 and the tabs 102 at the common interface 46. The illumination accessory 48 is capable of using energy stored in the rechargeable batteries 28 of the modular base unit 20 to operate the one or more LEDs 66 of the illumination accessory 48. It is to be appreciated that the common interface 46 can be inversely configured with the modular base unit 20 including the slot 100 and the tabs 102 and the accessory unit including the raised portion 94 and the pads 98.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A modular illumination assembly comprising:
   at least two units, one of said at least two units presenting a first adaptor and another of said at least two units presenting a second adaptor to be assembled with one another and disassembled from one another along a common interface;
   one of said at least two units being a modular base unit having an illumination device for illuminating an environment and a power supply electrically connected to said illumination device to supply power to said illumination device with said modular base unit having said first adaptor;
   another of said at least two units being an accessory unit without a power supply that requires power to operate with said accessory unit having said second adaptor;
   said modular base unit and said accessory unit being removably connectable mechanically and electrically with one another at said common interface by said first adaptor of said modular base unit and said second adaptor of said accessory unit to provide power between said modular base unit and said accessory unit;
   said modular base unit having a first housing defining a housing chamber with said first housing having a top wall with said first adaptor fixed to said top wall of said first housing; and said first housing of said modular base unit having a bottom wall with another second adaptor fixed to said bottom wall of said first housing, said second adaptor of said modular base unit having a common configuration with said second adaptor of said accessory unit.

2. A modular illumination assembly as set forth in claim 1 wherein either one of said first adaptor and said second adaptor includes a male connector and the other one of said first adaptor and said second adaptor includes a female connector.

3. A modular illumination assembly as set forth in claim 1 wherein said power supply comprises at least one rechargeable battery for powering said modular base unit.

4. A modular illumination assembly as set forth in claim 1 wherein said accessory unit comprises an illumination accessory.

5. A modular illumination assembly as set forth in claim 4 wherein said illumination accessory comprises an illumination shell, a protective shell disposed about and fixed to said illumination shell, and at least one LED fixed to said illumination shell and in electrical communication with either one of said first adaptor and said second adaptor.

6. A modular illumination assembly as set forth in claim 1 wherein said accessory unit comprises a solar charging accessory.

7. A modular illumination assembly as set forth in claim 6 wherein said solar charging accessory comprises a top surface and a solar panel fixed to said top surface and in electrical communication with either one of said first adaptor and said second adaptor.

8. A modular illumination assembly as set forth in claim 1 wherein said accessory unit comprises an adaptor charging accessory.

9. A modular illumination assembly as set forth in claim 8 wherein said adaptor charging accessory comprises an AC voltage adapter and a cable with a first end connected to either one of said first adaptor and said second adaptor and a second end having a power source adaptor.

10. A modular illumination assembly as set forth in claim 9 wherein said power source adaptor is a transformer for converting AC voltage into DC voltage.

11. A modular illumination assembly as set forth in claim 1 wherein said accessory unit comprises a portable electronic charging accessory.

12. A modular illumination assembly as set forth in claim 11 wherein said portable electronic charging accessory includes an electronic adaptor in electrical communication with either one of said first adaptor and said second adaptor for connecting electronic devices to said modular base unit.

13. A modular illumination assembly as set forth in claim 1 wherein said accessory unit comprises a media accessory.

14. A modular illumination assembly as set forth in claim 13 wherein said media accessory comprises a radio having a receiver, at least one speaker, and a radio switch in electrical communication with either one of said first adaptor and said second adaptor, said receiver, and said at least one speaker.

15. A modular illumination assembly as set forth in claim 1 wherein said accessory unit comprises a sterilization device.

16. A modular illumination assembly as set forth in claim 15 wherein said sterilization device comprises a UV sterilization device having a handle with a primary end connected to either one of said first adaptor and said second adaptor and a secondary end connected to a UV illumination wand.

17. A modular illumination assembly comprising:
at least two units, one of said at least two units presenting a first adaptor and another of said at least two units presenting a second adaptor to be assembled with one another and disassembled from one another along a common interface;
one of said at least two units being a modular base unit having an illumination device for illuminating an environment and a power supply electrically connected to said illumination device to supply power to said illumination device with said modular base unit having said first adaptor;
another of said at least two units being an accessory unit without a power supply that requires power to operate with said accessory unit having said second adaptor;
said modular base unit and said accessory unit being removably connectable mechanically and electrically with one another at said common interface by said first adaptor of said modular base unit and said second adaptor of said accessory unit to provide power between said modular base unit and said accessory unit; and
said modular base unit having a first housing defining a housing chamber with said first housing having a top wall defining a depression extending into said housing chamber, and said top wall of said first housing defining a first adaptor aperture extending through said first housing into said depression with said first housing having said first adaptor disposed in said first adaptor aperture fixed to said top wall, and said first adaptor and said depression partially defining said common interface.

18. A modular illumination assembly as set forth in claim 17 wherein said accessory unit includes a second housing having a bottom wall and a protrusion extending from said bottom wall, said bottom wall defining a second adaptor aperture extending through said protrusion into said second housing, said second adaptor being disposed in said second adaptor aperture extending into said second housing and fixed to said bottom wall, said second adaptor defining a socket extending to a distal end and has a rod extending into said socket and does not extend beyond the distal end of said socket, said second adaptor and said protrusion further partially define said common interface.

19. A modular illumination assembly as set forth in claim 17 wherein either one of said first adaptor and said second adaptor includes a male connector and the other one of said first adaptor and said second adaptor includes a female connector.

20. A modular illumination assembly as set forth in claim 17 wherein said power supply comprises at least one rechargeable battery for powering said modular base unit.

* * * * *